United States Patent
Tsai et al.

(10) Patent No.: US 10,697,919 B2
(45) Date of Patent: Jun. 30, 2020

(54) REDUCTION-OXIDATION SENSOR DEVICE AND MANUFACTURING METHOD THEREOF

(71) Applicant: Winbond Electronics Corp., Taichung (TW)

(72) Inventors: Ming-Chih Tsai, Taichung (TW); Yu-Hsuan Ho, Taichung (TW); Yen-Jui Chu, Taichung (TW); Ming-Hung Hsieh, Taichung (TW)

(73) Assignee: Winbond Electronics Corp., Taichung (TW)

( * ) Notice: Subject to any disclaimer, the term of this patent is extended or adjusted under 35 U.S.C. 154(b) by 275 days.

(21) Appl. No.: 15/867,724

(22) Filed: Jan. 11, 2018

(65) Prior Publication Data

US 2018/0209927 A1  Jul. 26, 2018

(30) Foreign Application Priority Data

Jan. 23, 2017 (CN) .......................... 2017 1 0058375

(51) Int. Cl.
*G01N 27/12* (2006.01)
*B41J 2/04* (2006.01)

(52) U.S. Cl.
CPC ......... *G01N 27/128* (2013.01); *G01N 27/127* (2013.01); *B41J 2/04* (2013.01)

(58) Field of Classification Search
CPC .... B82Y 30/00; G01N 27/127; G01N 27/128; G01N 27/416
See application file for complete search history.

(56) References Cited

U.S. PATENT DOCUMENTS

| 7,872,324 B2 * | 1/2011 | Kim ..................... B81B 3/0021 257/448 |
| 2009/0071848 A1 | 3/2009 | Seal et al. |
| 2010/0176822 A1 * | 7/2010 | Offermans ............. B82Y 15/00 324/663 |
| 2011/0195514 A1 | 8/2011 | Apblett et al. |

(Continued)

FOREIGN PATENT DOCUMENTS

| CN | 103399073 | 11/2013 |
| CN | 102735711 | 2/2015 |
| TW | I436055 | 5/2014 |

OTHER PUBLICATIONS

Derek Davin Bussan, "Applications of Molybdenum Utilized in Sensing Devices," Graduate College of the Oklahoma State University, May 2011, pp. 1-83.

(Continued)

*Primary Examiner* — Dominic E Hawkins
(74) *Attorney, Agent, or Firm* — JCIPRNET

(57) ABSTRACT

A reduction-oxidation sensor device and a manufacturing method thereof are provided. The reduction-oxidation sensor device includes a first electrode, at least one sensing structure and a second electrode. The first electrode is located on a substrate. The at least one sensing structure is located on the first electrode and the substrate. The at least one sensing structure includes a metal nanowire layer and a metal oxide layer. The metal nanowire layer is disposed on the first electrode and the substrate. The metal nanowire layer is wrapped by the metal oxide layer. The second electrode is located on the at least one sensing structure.

13 Claims, 6 Drawing Sheets

(56) References Cited

U.S. PATENT DOCUMENTS

| | | | |
|---|---|---|---|
| 2012/0272721 A1* | 11/2012 | Kochupurackal .. | G01N 27/4141 73/31.06 |
| 2014/0238833 A1* | 8/2014 | Virkar ................ | H03K 17/9622 200/600 |
| 2014/0315323 A1 | 10/2014 | Pereira et al. | |
| 2016/0170521 A1* | 6/2016 | Choi ....................... | G06F 3/044 345/174 |

OTHER PUBLICATIONS

L. Santos, et al., "Electrodeposition of WO3 Nanoparticles for Sensing Applications," The Author(s), Dec. 2015 pp. 27-47.

G. R. Langereis, et al., "Measuring conductivity, temperature and hydrogen peroxide concentration using a single sensor structure," IEEE, Transducers '97, Jun. 1997, pp. 543-546.

Sofian M. Kanan, et al., "Semiconducting Metal Oxide Based Sensors for Selective Gas Pollutant Detection," Sensors, vol. 9, Oct. 2009, pp. 8158-8196.

\* cited by examiner

REDUCTION-OXIDATION SENSOR DEVICE AND MANUFACTURING METHOD THEREOF

CROSS-REFERENCE TO RELATED APPLICATION

This application claims the priority benefit of China application serial no. 201710058375.7, filed on Jan. 23, 2017. The entirety of the above-mentioned patent application is hereby incorporated by reference herein and made a part of this specification.

BACKGROUND OF THE INVENTION

1. Field of the Invention

The present invention generally relates to a sensor device, in particular, to a sensor device suitable for sensing a reduction-oxidation reaction.

2. Description of Related Art

By sensing a phenomenon of reduction and oxidation, gas and pH value and so on can be detected. In conventional sensing technologies, an enzyme having high selectivity to an object to be detected can be further applied to transform the object to an oxidized material. Subsequently, a concentration of the object can be indirectly obtained according to a variation of a concentration or a color of the oxidized material. For example, when an object is ethanol, alcohol oxidase (AOD) may be applied to transform ethanol to hydrogen peroxide ($H_2O_2$). Afterward, a content of ethanol is obtained by sensing a concentration of hydrogen peroxide. For example, a method of sensing hydrogen peroxide is applying a reduction potential on an electrode, such that hydrogen peroxide is reduced to water. Subsequently, a concentration of hydrogen peroxide is calculated by measuring a variation of electric current.

In general, a sensor device for sensing a reduction-oxidation reaction includes a sensing layer composed of a metal oxide with a low valence number. For example, the metal oxide with a low valence number may be titanium oxide, ferric oxide, aluminum oxide, zirconium oxide or manganese oxide. A content of an oxidizing agent or a reducing agent in a test sample can be obtained by measuring a variation of conductivity of the metal oxide with a low valence number. However, the above-mentioned sensor device has problems of a low sensitivity and a relatively narrow sensing range. Therefore, improving a sensitivity and enlarging a sensing range of the sensor device for a reduction-oxidation reaction are important subjects at present.

SUMMARY OF THE INVENTION

Accordingly, the present invention is directed to a reduction-oxidation sensor device and a manufacturing method thereof, in order to improve a sensitivity and enlarge a sensing range of the reduction-oxidation sensor device.

A reduction-oxidation sensor device includes a first electrode, at least one sensing structure and a second electrode. The first electrode is located on a substrate. The at least one sensing structure is located on the first electrode and the substrate. The at least one sensing structure includes a metal nanowire layer and a metal oxide layer. The metal nanowire layer is disposed on the first electrode and the substrate. The metal oxide layer is disposed on the metal nanowire layer so as to wrap the metal nanowire layer. The second electrode is located on the at least one sensing structure.

A manufacturing method of a reduction-oxidation sensor device of the present invention includes the following steps. Firstly, forming a first electrode on a substrate. Subsequently, forming at least one sensing structure on the first electrode and the substrate. A method for forming the at least one sensing structure includes forming a metal nanowire layer on the first electrode and the substrate, and forming a metal oxide layer on the metal nanowire layer so as to wrap the metal nanowire layer. Afterward, forming a second electrode on the at least one sensing structure.

As above, both of the metal oxide layer and the metal nanowire in the reduction-oxidation sensor device of the present invention can be applied for sensing a reduction-oxidation reaction. Additionally, due to a very large variation of conductivity between a reduction state and an oxidation state of the metal nanowire layer, the reduction-oxidation sensor device can possess a wide sensing range and a great sensitivity for a reduction-oxidation reaction. Moreover, since the metal nanowire layer is wrapped by the metal oxide layer, the metal nanowire layer can be avoided from being affected by moisture, oxygen and temperature of the atmosphere. Accordingly, a reliability of the reduction-oxidation sensor device can be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
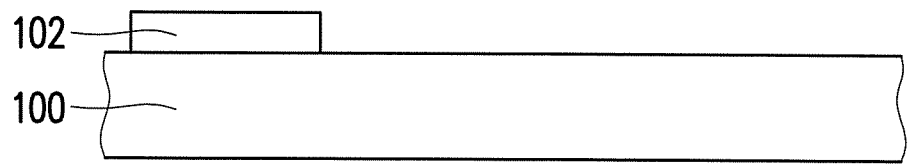
FIG. 1A through FIG. 1C are cross-sectional schematic views illustrating a process flow of a reduction-oxidation sensor device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
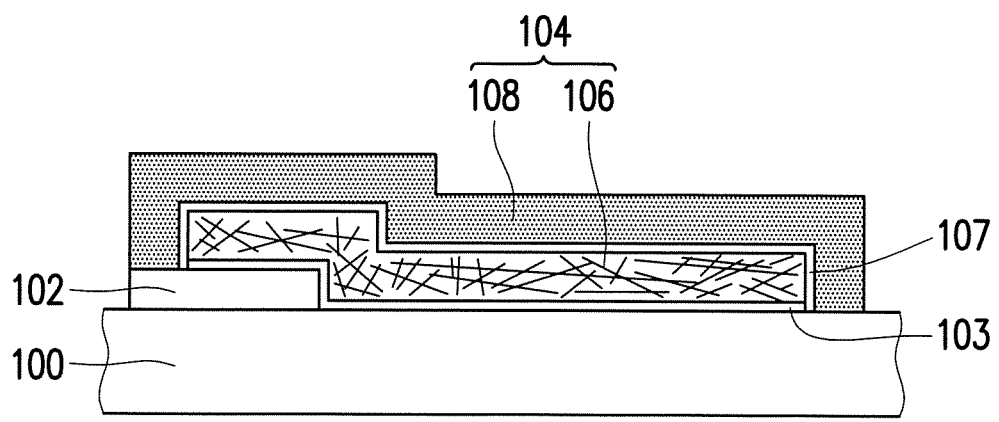
Figure 1C:
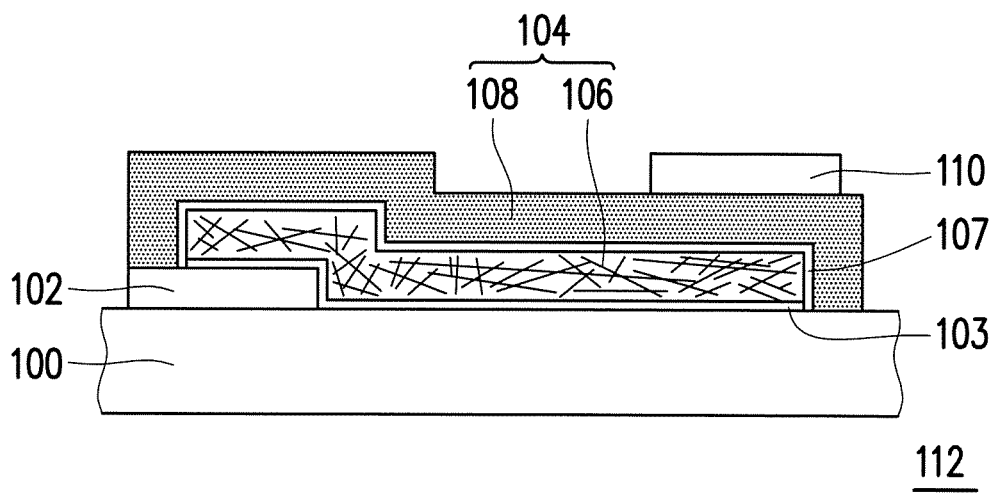
Figure 2A:
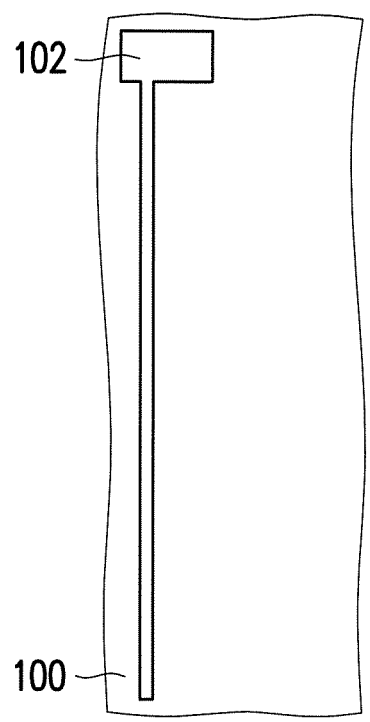
FIG. 2A through FIG. 2C are top views of the process flow of the reduction-oxidation sensor device as shown in FIG. 1A through FIG. 1C, respectively.
Figure 2B:
Figure 2C:
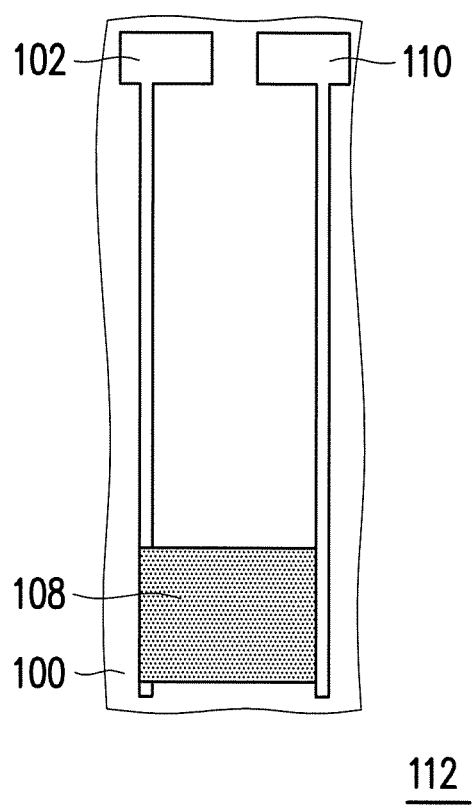

FIG. 1A through FIG. 1C are cross-sectional schematic views illustrating a process flow of a reduction-oxidation sensor device according to an embodiment of the present invention. FIG. 2A through FIG. 2C are top views of the process flow of the reduction-oxidation sensor device as shown in FIG. 1A through FIG. 1C, respectively.

Referring to FIG. 1A and FIG. 2A, a manufacturing method of a reduction-oxidation sensor device of the present embodiment includes the following steps. Firstly, a first electrode 102 is formed on a substrate 100. In particular, the first electrode 102 may be disposed in a peripheral region of the substrate 100. In an embodiment, the substrate 100 may be a flexible substrate. For example, a material of the flexible substrate may include polyethylene terephthalate (PET), polyethylene naphthalate (PEN), polyimide (PI), polyvinyl chloride (PVC), polypropylene (PP), cycloolefin polymer (COP) and polyethylene (PE). In other embodiments, the substrate 100 may also be a non-flexible substrate. For example, a material of the non-flexible substrate may be glass.

In an embodiment, a method for forming the first electrode 102 may include inkjet printing. Specifically, an ink of inkjet printing may be a conductive carbon ink, of which a carbon source may include conductive carbon powder, carbon nanotube and graphene (or reduced graphite oxide). In an embodiment, the first electrode 102 may be formed to be a strip shape as shown in FIG. 2A. However, the present invention is not limited to a pattern of the first electrode 102. A person having ordinary skills in the art may form the first electrode 102 to be other suitable patterns according to design requirements.

Referring to FIG. 1B and FIG. 2B, a sensing structure 104 is formed on the first electrode 102 and the substrate 100. Specifically, both of the sensing structure 104 and the first electrode 102 may be disposed in the peripheral region of the substrate 100. A method for forming the sensing structure 104 includes the following steps. Firstly, a metal nanowire layer 106 is formed on the first electrode 102 and the substrate 100. In an embodiment, the metal nanowire layer 106 includes a plurality of metal nanowires. For instance, a material of the metal nanowires may include silver, copper or other metal materials with high conductivity. A diameter of each metal nanowire may be in a range between 1 nm and 100 nm, and a length of each metal nanowire may be in a range between 100 nm and 100 μm. A method for forming the metal nanowire layer 106 may include inkjet printing. For example, a solution containing a plurality of metal nanowires may be conformally formed on the first electrode 102 and the substrate 100. Afterward, a curing process is performed to remove a solvent of the solution, so as to form the metal nanowire layer 106. In an embodiment, a thickness of the metal nanowire layer 106 may be in a range between 20 nm and 200 nm.

In an embodiment, the metal nanowires of the metal nanowire layer 106 are in a reduction state, in order to be applied for sensing a content of an oxidizing agent. Particularly, when the metal nanowires in a reduction state are oxidized, a conductivity of the metal nanowires decreases and an appearance of the metal nanowires turns into ash grey from metallic luster. In an embodiment, the oxidizing agent may include hydrogen peroxide, superoxide ion, ozonide ion, carbon dioxide and nitrogen dioxide. The present invention is not limited to types of the oxidizing agent. On the other hand, in other embodiments, the metal nanowires of the metal nanowire layer 106 may also be in an oxidation state, so as to be applied for sensing a content of a reducing agent. In an embodiment, the reducing agent may include hydrogen, hydrogen sulphide and carbon monoxide. The present invention is not limited to types of the reducing agent. A difference between a conductivity of metal nanowires in a reduction state and a conductivity of metal nanowires in an oxidation state is very large. Thus, the metal nanowire layer 106 can have a wide sensing range and a great sensitivity to the oxidizing agent and the reducing agent.

Afterward, a metal oxide layer 108 is formed to wrap the metal nanowire layer 106. In an embodiment, the metal oxide layer 108 may include a transition metal oxide with a high valence number. The high valence number is defined to be a valence number larger than or equal to 4. Preferably, the metal oxide layer 108 may include a transition metal oxide having a valence number of 5 or 6. For instance, the transition metal oxide with the high valence number may include tungsten oxide, molybdenum oxide and vanadium oxide. In addition, the transition metal oxide with the high valence number may be a nanoparticle, of which a diameter is in a range between 1 nm to 100 nm. In an embodiment, a method for forming the metal oxide layer 108 includes inkjet printing. Particularly, a solution containing the transition metal oxide with the high valence number may be formed over the metal nanowire layer 106, such that the metal nanowire layer 106 is enclosed by the above-mentioned solution. Subsequently, performing a curing process to remove a solvent of the above-mentioned solution, so as to form the metal oxide layer 108. In an embodiment, a thickness of the metal oxide layer 108 may be in a range between 20 nm and 200 nm.

In an embodiment, the metal oxide layer 108 may include a transition metal oxide with the high valence number and in a reduction state. When the transition metal oxide with the high valence number is in a reduction state, it exhibits higher conductivity, and appears in a color of non-transparent dark blue. Once the transition metal oxide with the high valence number and in a reduction state contacts an oxidizing agent and turns into a oxidation state, a conductivity thereof is reduced, and appearance thereof turns into a color of transparent yellow. Based on the change of conductivity and color, the metal oxide layer 108 is suitable for sensing a content of an oxidizing agent. On the other hand, in other embodiments, the metal oxide layer 108 may also include a transition metal oxide with the high valence number and in an oxidation state. Accordingly, the metal oxide layer 108 is suitable for sensing a content of a reducing agent. As a result of the metal nanowire layer 106 is wrapped by the metal oxide layer 108, the metal nanowire layer 106 can be avoided from being affected by moisture, oxygen and temperature of the atmosphere.

A first polymer material layer 103 may be selectively formed on the first electrode 102 and the substrate 100 before the step of forming the metal nanowire layer 106. Thereby, the first polymer material layer 103 may be located between the first electrode 102 and the metal nanowire layer 106, and between the substrate 100 and the metal nanowire layer 106. The first polymer material layer 103 may carry a positive charge, which may improve an adhesion between the first electrode 102 and the metal nanowire layer 106, and may improve an adhesion between the substrate 100 and the metal nanowire layer 106. In some embodiments, the first polymer material layer 103 may be a self-assembly layer. A material of the first polymer material layer 103 may include polyethyleneimine (PEI), polyethylenimine ethoxylated (PEIE), poly(diallyldimethylammonium chloride) (PDDA) and polylysine.

Similarly, a second polymer material layer 107 may be selectively formed on the metal nanowire layer 106 before the step of forming the metal oxide layer 108. Accordingly, the second polymer material layer 107 may be located between the metal nanowire layer 106 and the metal oxide layer 108. As similar to the first polymer material layer 103, the second polymer material layer 107 may also carry a positive charge. Thus, an adhesion between the metal nanowire layer 106 and the metal oxide layer 108 may be improved. In an embodiment, the second polymer material layer 107 may also be a self-assembly layer. A material of the second polymer material layer 107 may include polyethyleneimine (PEI), polyethylenimine ethoxylated (PETE), poly(diallyldimethylammonium chloride) (PDDA) and polylysine. A method for forming the first polymer material layer 103 and the second polymer material layer 107 may also include inkjet printing.

Please refer to FIG. 1C and FIG. 2C, a second electrode 110 is formed on the sensing structure 104, so as to complete manufacturing a reduction-oxidation sensor device 112. As similar to the method for forming the first electrode 102, a method for forming the second electrode 110 may include inkjet printing as well. To be more specific, an ink of inkjet printing may be a conductive carbon ink, of which a carbon source may include conductive carbon powder, carbon nanotube and graphene (or reduced graphite oxide). In an embodiment, the second electrode 110 may be formed to be a strip shape as shown in FIG. 2C. However, the present invention is not limited to a pattern of the second electrode 110. A person having ordinary skills in the art may form the second electrode 110 to be other suitable patterns according to design requirements.

Thereafter, a structure of the reduction-oxidation sensor device 112 of the present invention will be described in accompany with FIG. 1C and FIG. 2C.

Referring to FIG. 1C and FIG. 2C, the reduction-oxidation sensor device 112 includes a first electrode 102, a sensing structure 104 and a second electrode 110. The first electrode 102 is located on the substrate 100. A material of the substrate 100 may include glass, polyethylene terephthalate (PET), polyethylene naphthalate (PEN), polyimide (PI), polyvinyl chloride (PVC), polypropylene (PP), cycloolefin polymer (COP) and polyethylene (PE). The sensing structure 104 is located on the first electrode 102 and the substrate 100, and the first electrode 102 and the sensing structure 104 may be disposed in a peripheral region of the substrate 100. The sensing structure 104 includes a metal nanowire layer 106 and a metal oxide layer 108. The metal nanowire layer 106 may be disposed on the first electrode 102 and the substrate 100. The metal nanowire layer 106 may include a plurality of metal nanowires, of which a diameter of each nanowire is in a range between 1 nm and 100 nm, and a length of each nanowire is in a range between 100 nm and 100 μm. The metal oxide layer 108 wraps the metal nanowire layer 106. The metal oxide layer 108 may include a transition metal oxide with a high valence number. The transition metal oxide with a high valence number may include tungsten oxide, molybdenum oxide and vanadium oxide. The transition metal oxide with a high valence number may be a nanoparticle, of which a length is in a range between 1 nm and 100 nm. The second electrode 110 is located on the sensing structure 104. Materials of the first electrode 102 and the second electrode 110 may include conductive carbon powder, carbon nanotube and graphene. In an embodiment, the reduction-oxidation sensor device 112 may further include a first polymer material layer 103 carrying a positive charge. The first polymer material layer 103 carrying a positive charge is located between the metal nanowire layer 106 and the first electrode 102, and between the metal nanowire layer 106 and the substrate 100. Similarly, the reduction-oxidation sensor device 112 may further include a second polymer material layer 107 carrying a positive charge. The second polymer material layer 107 carrying a positive charge is located between the metal oxide layer 108 and the metal nanowire layer 106. Materials of the first polymer material layer 103 and the second polymer material layer 107 may include polyethyleneimine (PEI), polyethylenimine ethoxylated (PEIE), poly(diallyldimethylammonium chloride) (PDDA) and polylysine.

Based on above, both of the metal oxide layer 108 and the metal nanowire 106 in the reduction-oxidation sensor device 112 can be applied for sensing a reduction-oxidation reaction. Additionally, due to a very large variation of conductivity between a reduction state and an oxidation state of the metal nanowire layer 106, the reduction-oxidation sensor device 112 can have a wide sensing range and a great sensitivity for a reduction-oxidation reaction. Moreover, since the metal nanowire layer 106 is wrapped by the metal oxide layer 108, the metal nanowire layer 106 can be avoided from being affected by moisture, oxygen and temperature of the atmosphere. Accordingly, a reliability of the reduction-oxidation sensor device 112 can be improved.

Figure 3:
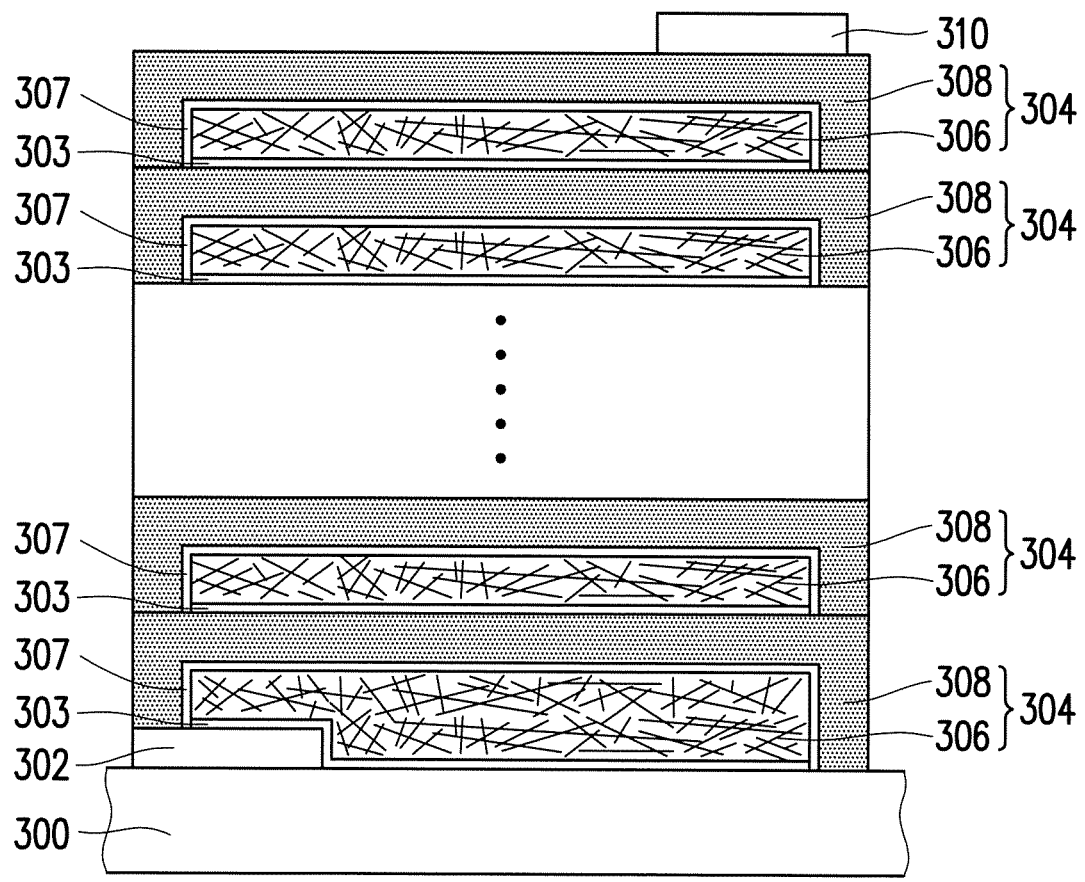
FIG. 3 is a cross-sectional schematic view illustrating a reduction-oxidation sensor device according to another embodiment of the present invention.

FIG. 3 is a cross-sectional schematic view illustrating a reduction-oxidation sensor device according to another embodiment of the present invention.

Referring to FIG. 1C and FIG. 3 together, a reduction-oxidation sensor device 312 of FIG. 3 is similar with the reduction-oxidation sensor device 112 of the FIG. 1C. A major difference of the reduction-oxidation sensor device 312 and the reduction-oxidation sensor device 112 is that the reduction-oxidation sensor device 312 of FIG. 3 includes a plurality of sensing structures 304, which are stacked on the first electrode 302 and the substrate 300.

Particularly, the reduction-oxidation sensor device 312 may include the plurality of sensing structures 304 between the first electrode 302 and the second electrode 310. The present invention is not limited to a number of the sensing structures 304, a person having ordinary skills in the art may alter the number of the sensing structures 304 according to design requirements. Each of the sensing structures 304 includes a metal nanowire layer 306 and a metal oxide layer 308. The metal oxide layer 308 wraps the metal nanowire layer 306. In addition, the reduction-oxidation sensor device 312 may further include a plurality of first polymer material layers 303 and a plurality of second polymer material layers 307. Each first polymer material layer 303 may be located between each corresponding metal nanowire layer 306 and a layer therebelow. Each second polymer material layer 307 may be located between each corresponding metal nanowire layer 306 and each corresponding metal oxide layer 308.

In the present embodiment, a method for forming the lowest metal nanowire layer 306 may include dip coating, spin coating and blade coating. Thereby, the lowest metal nanowire layer 306 may be formed to have a substantially flat upper surface.

In some embodiments, the plurality of sensing structures 304 between the first electrode 302 and the second electrode 310 may be connected in parallel. Accordingly, an equivalent resistance of the reduction-oxidation sensor device 312 can be reduced by increasing a number of the sensing structures 304. In other words, a conductivity of the reduction-oxidation sensor device 312 can be raised by increasing the number of the sensing structures 304. As a result, a sensing range of the reduction-oxidation sensor device 312 can be altered by adjusting the number of the sensing structures 304.

Thereafter, an experimental example will be described to verify the effects of the present invention, but the present invention is not limited to the following description.

Figure 4:
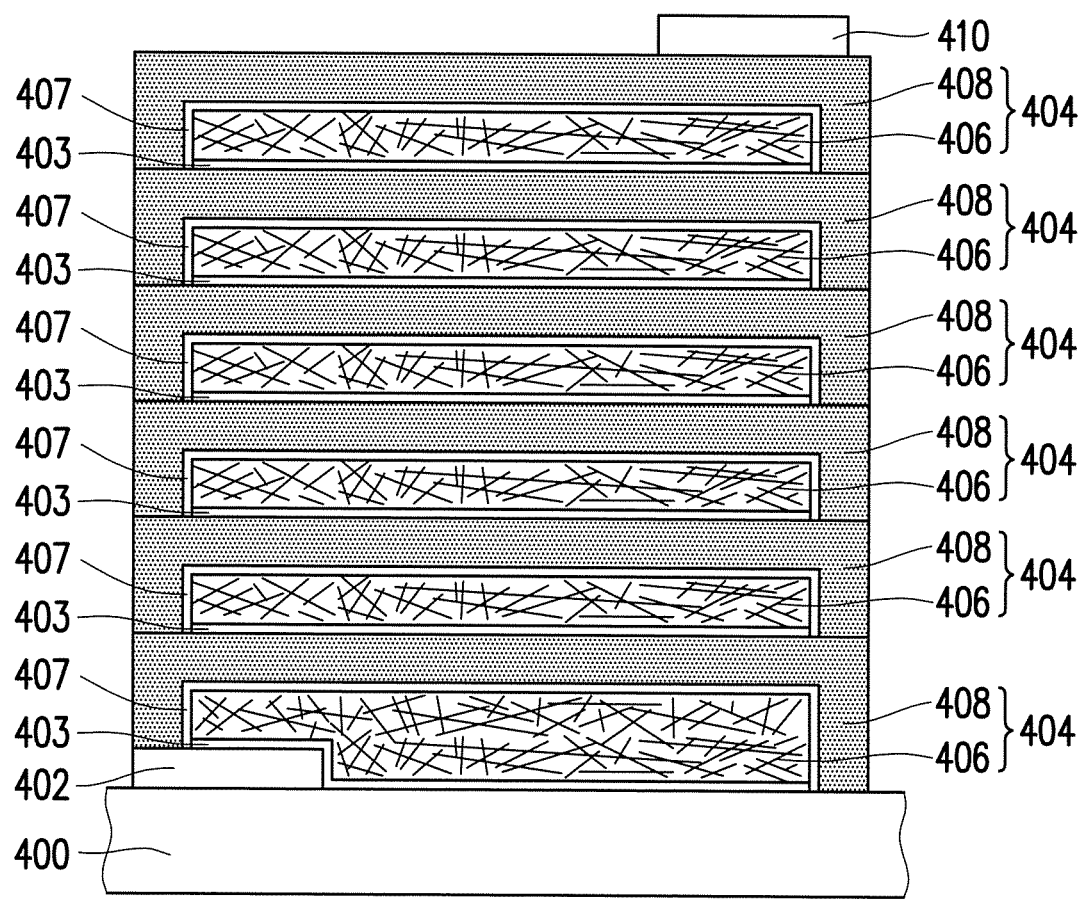
FIG. 4 is a cross-sectional schematic view illustrating a reduction-oxidation sensor device according to an experimental example of the present invention.
Figure 5:
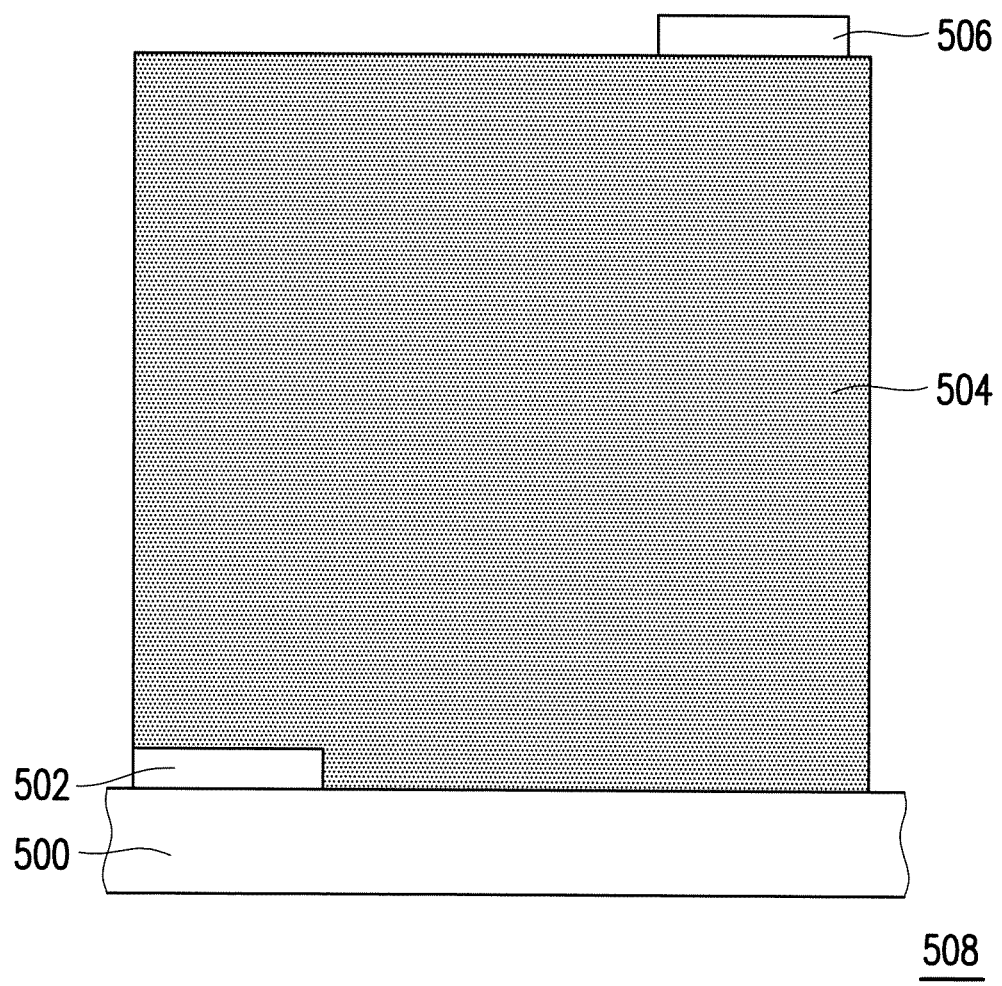
FIG. 5 is a cross-sectional schematic view of a reduction-oxidation sensor device of a comparative example.

FIG. 4 is a cross-sectional schematic view illustrating a reduction-oxidation sensor device according to an experimental example of the present invention. FIG. 5 is a cross-sectional schematic view of a reduction-oxidation sensor device of a comparative example.

EXPERIMENTAL EXAMPLE

Referring to FIG. 3 and FIG. 4 together, as similar to the reduction-oxidation sensor device 312, a reduction-oxidation sensor device 412 of the present experimental example has 6 sensing structures 412 between a first electrode 402 and a second electrode 410. Each of the sensing structures 412 includes a metal nanowire layer 406 and a meal oxide layer 408. The metal oxide layer 408 wraps the metal nanowire layer 406. In addition, the first electrode 402 and the 6 sensing structures 404 are located on a substrate 400. In the present experimental example, the reduction-oxidation sensor device 412 further includes 6 first polymer material layers 403 and 6 second polymer material layers 407. Each first polymer material layer 403 may be located between each corresponding metal nanowire layer 406 and a layer therebelow. Each second polymer material layer 407 may be located between each corresponding metal nanowire layer 406 and each corresponding metal oxide layer 408. Additionally, a material of each metal oxide layer 408 is molybdenum oxide in a reduction state. Each metal nanowire layer 406 includes a plurality of silver nanowires in a reduction state.

COMPARATIVE EXAMPLE

Referring to FIG. 4 and FIG. 5 together, a difference between a reduction-oxidation sensor device 508 of the comparative example and the reduction-oxidation sensor device 412 of the experimental example is that: the reduction-oxidation sensor device 512 of the comparative example do not include a metal nanowire layer, a first polymer material layer and a second polymer material layer. As a result, a sensing structure of the reduction-oxidation sensor device 508 is a single-layered metal oxide layer 504. A first electrode 502 and the single-layered metal oxide layer 504 are located on a substrate 500, and a second electrode 506 is located on the single-layered metal oxide layer 504. Furthermore, both of a material of the metal oxide layer 504 and the material of the metal oxide layer 408 in FIG. 4 is molybdenum oxide in a reduction state. In addition, a thickness of the metal oxide layer 504 on the substrate 500 is the same as a total thickness of the 6 sensing structures 404.

The reduction-oxidation sensor device 412 of the experimental example and the reduction-oxidation sensor device 508 of the comparative example are dipped in sample solution 1 through sample solution 3 that have different contents of hydrogen peroxide. Subsequently, a resistance value between the first electrode and the second electrode of the reduction-oxidation sensor device 412 of the experimental example and a resistance value between the first electrode and the second electrode of the reduction-oxidation sensor device 512 of the comparative example are measured after rinsing via pure water and then drying. A result of the above-mentioned resistance values are shown in the following table 1.

TABLE 1

|  | content of hydrogen peroxide (ppm) | experimental example resistance value ($\Omega$) | comparative example resistance value ($\Omega$) |
| --- | --- | --- | --- |
| before reaction | 0 | $1 \times 10^3$ | $20 \times 10^6$ |
| sample solution 1 | 10 | $20 \times 10^6$ | $40 \times 10^6$ |
| sample solution 2 | 30 | $200 \times 10^6$ | $200 \times 10^6$ |
| sample solution 3 | 180 | $200 \times 10^9$ | $200 \times 10^9$ |

According to the table 1 as above, a resistance value of the experimental example is significantly lowered than a resistance value of the comparative example before reaction. A difference between the experimental example and the comparative example is that the sensing structures of the reduction-oxidation sensor device 412 of the experimental example include the metal nanowire layers 406 and the metal oxide layers 408, while the sensing structure of the reduction-oxidation sensor device 508 of the comparative example merely includes the metal oxide layer 504. A conductivity of silver nanowires in a reduction state is higher than a conductivity of molybdenum oxide in a reduction state, thus a conductivity of the metal nanowire layer 406 is higher than a conductivity of the metal oxide layer 408 or the metal oxide layer 504. Thereby, the reduction-oxidation sensor device 412 of the experimental example can exhibit a lower resistance value before reaction.

The metal oxide layer 408 and the metal nanowire layer 406 of the experimental example and the metal oxide layer 504 of the comparative example are gradually oxidized after contacting with hydrogen peroxide. Thus, both of the resistance values of the experimental example and the comparative example raise. Referring to the results corresponded to the sample solution 3, both of the metal oxide layer 408 and the metal nanowire layer 406 of the experimental example and the metal oxide layer 504 of the comparative example have been completely reacted, so that resistance values of the experimental example and the comparative example are raised to an approximately equivalent level (i.e., $10^9 \Omega$).

Thereby, the resistance value of the experimental example is significantly lower than the resistance value of the comparative example before reaction. In addition, the resistance value of the experimental example and the resistance value of the comparative example are at an approximately equivalent level after complete reaction. For the same range of hydrogen peroxide content, an amount of resistance value variation of the experimental example is obviously greater than an amount of resistance value variation of the comparative example. In other words, the reduction-oxidation sensor device 412 of the experimental example has a greater sensitivity to hydrogen peroxide content.

Additionally, according to the resistance values corresponded to the sample solution 1 and the sample solution 2 (i.e., corresponded to very low hydrogen peroxide contents), a resistance value variation of the experimental example before and after reaction is 20,000 times and 200,000 times, respectively. In contrast, a difference between the resistance values of the comparative example before and after reaction is rather insignificant. Therefore, the reduction-oxidation sensor device 412 is capable of sensing hydrogen peroxide with a relatively low content.

As above, both of the metal oxide layer and the metal nanowire in the reduction-oxidation sensor device of the present invention can be applied for sensing a reduction-oxidation reaction. Additionally, due to a very large variation of conductivity between a reduction state and an oxidation state of the metal nanowire layer, so that the reduction-oxidation sensor device can possess a wide sensing range and a great sensitivity for a reduction-oxidation reaction. Moreover, since the metal nanowire layer is wrapped by the metal oxide layer, the metal nanowire layer can be avoided from being affected by moisture, oxygen and temperature of the atmosphere. Accordingly, a reliability of the reduction-oxidation sensor device can be improved. Furthermore, the first electrode, the sensing structure, the polymer material layers and the second electrode of the reduction-oxidation sensor device of the present invention may be formed by a three-dimensional printing step. Thus the reduction-oxidation sensor device of the present invention can be operated on a surface of any material. In addition, a method of using a mask, a protruded plate or a recessed plate for patterning is not required for forming the reduction-oxidation sensor device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A reduction-oxidation sensor device, comprising:
   a first electrode, located on a substrate;
   at least one sensing structure, located on the first electrode and the substrate, the at least one sensing structure comprises:
      a metal nanowire layer, disposed on the first electrode and the substrate; and
      a metal oxide layer, disposed on the metal nanowire layer so as to wrap the metal nanowire layer; and
   a second electrode, located on the at least one sensing structure.

2. The reduction-oxidation sensor device according to claim 1, wherein the metal oxide layer comprises a transition metal oxide with a valence number larger than or equal to 4.

3. The reduction-oxidation sensor device according to claim 2, wherein the transition metal oxide comprises tungsten oxide, molybdenum oxide and vanadium oxide.

4. The reduction-oxidation sensor device according to claim 2, wherein the transition metal oxide is a nanoparticle having a diameter in a range between 1 nm and 100 nm.

5. The reduction-oxidation sensor device according to claim 1, further comprising a first polymer material layer carrying a positive charge and a second polymer material layer carrying a positive charge, the first polymer material layer is located between the metal nanowire layer and the first electrode, and between the metal nanowire layer and the substrate, the second polymer material layer is located between the metal oxide layer and the metal nanowire layer.

6. The reduction-oxidation sensor device according to claim 5, wherein a material of the first polymer material layer and a material of the second polymer material layer comprise polyethylenimine, polyethylenimine ethoxylated, poly(diallyldimethylammonium chloride) and polylysine.

7. The reduction-oxidation sensor device according to claim 1, wherein the metal nanowire layer comprises a plurality of metal nanowires, of which a diameter of each nanowire is in a range between 1 nm and 100 nm, and a length of each nanowire is in a range between 100 nm and 100 μm.

8. The reduction-oxidation sensor device according to claim 1, wherein a material of the substrate comprises glass, polyethylene terephthalate, polyethylene naphthalate, polyimide, polyvinyl chloride, polypropylene, cycloolefin polymer and polyethylene, and the first electrode and the at least one sensing structure are located in a peripheral region of the substrate.

9. The reduction-oxidation sensor device according to claim 1, wherein a material of the first electrode and a material of the second electrode comprise conductive carbon powder, carbon nanotube and graphene.

10. A manufacturing method of a reduction-oxidation sensor device, comprising:
    forming a first electrode on a substrate;
    forming at least one sensing structure on the first electrode and the substrate, wherein a method for forming the at least one sensing structure comprises:
       forming a metal nanowire layer on the first electrode and the substrate; and
       forming a metal oxide layer on the metal nanowire layer so as to wrap the metal nanowire layer; and
    forming a second electrode on the at least one sensing structure.

11. The manufacturing method of the reduction-oxidation sensor device according to claim 10, wherein the metal oxide layer comprises a transition metal oxide with a valence number larger than or equal to 4.

12. The manufacturing method of the reduction-oxidation sensor device according to claim 11, further comprising the following steps:
    forming a first polymer material layer on the first electrode and the substrate before the step of forming the metal nanowire layer; and
    forming a second polymer material layer on the metal nanowire layer before the step of forming the metal oxide layer.

13. The manufacturing method of the reduction-oxidation sensor device according to claim 12, wherein the first electrode, the second electrode, the first polymer material layer, the second polymer material layer and the at least one sensing structure are formed by inkjet printing.

* * * * *